United States Patent [19]

Fan et al.

[11] 4,283,437

[45] Aug. 11, 1981

[54] METHOD FOR FRYING FOODS AND FRIED FOOD PRODUCTS

[75] Inventors: Lucy L. Fan, Irving; Alan Wohlman, Richardson; Bobby J. Longan, Carrollton, all of Tex.

[73] Assignee: Frito-Lay, Inc., Dallas, Tex.

[21] Appl. No.: 63,090

[22] Filed: Aug. 2, 1979

[51] Int. Cl.³ .................................... A23L 1/216
[52] U.S. Cl. .................................. 426/637; 426/417; 426/438; 426/439
[58] Field of Search ............... 426/438, 439, 601, 637, 426/417

[56] References Cited

U.S. PATENT DOCUMENTS 3,597,227  8/1971  Murray et al. .................. 426/438
3,708,311  1/1973  Bolton et al. ................... 426/438

OTHER PUBLICATIONS

Shaw et al., Agricultural Research Service, U.S. Dept. of Agriculture, pp. 1–9, May, 1968.
Scarpelli, Science, vol. 185, pp. 958–960, 1974.
Eaves et al., J. Am. Oil Chemists' Soc., vol. 45, pp. 293–295, 1968.
Pons et al., J. Am. Oil Chemists' Soc., vol. 40, No. 1 pp. 10–13, 1963.
Hopkins et al., J. Am. Oil Chemists' Soc., vol. 50, pp. 381–384, Sep. 1973.
Nixon et al., Lipids, vol. 9, No. 5, pp. 314–321.
Hutchins et al., J. Am. Oil Chemists' Soc., vol. 45, pp. 397–399, 1968.
Zarius et al., J. Am. Oil Chemists' Soc., vol. 47, pp. 215–218, 1970.
Wells et al., J. Am. Oil Chemists' Soc., vol. 51, pp. 456–460, 1974.
Food Chemical News, p. 52, Jul. 5, 1976.
Allen et al., Lipids, vol. 2, No. 5, pp. 419–423.

Primary Examiner—Joseph M. Golian
Assistant Examiner—George C. Yeung
Attorney, Agent, or Firm—Bernard, Rothwell & Brown

[57] ABSTRACT

A method for counteracting the development of light-induced, undesirable organoleptic characteristics in oil-absorbing foods, especially farinaceous snack foods, fried in cottonseed oil which comprises frying the food in cottonseed oil from which the cyclopropenoid fatty acids have been extensively removed. Light-stable, farinaceous snacks and other food products containing cottonseed oil from which cyclopropenoid fatty acids have been removed are also provided.

8 Claims, No Drawings

METHOD FOR FRYING FOODS AND FRIED FOOD PRODUCTS

The present invention relates to a process for frying foods, such as snack foods, to obtain products of improved light stability, and to fried foods containing an improved purified cottonseed oil.

It is known that foods, especially foods which tend to absorb oil such as potato chips and other farinaceous materials, which have been fried in edible cottonseed oils provide products having particularly desirable organoleptic properties, such as flavor. Cottonseed oil is also a frequent choice for use in frying such foods, as compared to other vegetable oils, because it is attractively priced. Cottonseed oil is, however, susceptible to photo-oxidation which produces undesirable taste and odor. This reaction an its effects are sometimes referred to as a "light-struck" condition or photo-induced off-flavor and odor. The photo-oxidation of foods fried in cottonseed oil is a considerable problem, especially in the case of snack foods such as potato chips and other farinaceous materials. The rate at which these objectionable characteristics are developed in foods depends upon the intensity of the light to which the food is subjected. Thus, at high intensity levels such as direct sunlight, light struck may develop quite rapidly even while, for instance, potato chips are being displayed for consumption in an open dish or basket or in a transparent or translucent, or even opaque, package during normal display for sale in store light. It is, therefore, highly desirable that the possibility of light struck developing be minimized.

It has been reported that 1-decyne, an acetylenic material, is present in slightly-oxidized cottonseed oil, and that it may also be a major component of the notable decomposition products of a slightly auto-oxidized soybean oil. This acetylenic material may contribute to the initial off-flavor of some vegetable oils. Smouse, Mookherjee and Chang, "Identification of Dec-1-yne in the Initial Auto-oxidation Products of Some Vegetable Oils", *Chemistry and Industry*, 1301–1303, July 17, 1965. The mechanism for formation of 1-decyne was reported to be through the auto-oxidation of oleic acid glycerides, a rather common component of various oils. The authors did not disclose any particular characteristics of cottonseed oils that would account for their unique behavior with respect to developing light struck in foods by photo-oxidation.

It has also been reported to us by private communication that the presence of 1-decyne in photo-oxidized, light struck snacks, especially potato chips, fried in cottonseed oil, may be the cause of the bad odor and taste characteristics. The source of this acetylenic material was, however, unknown, and that proposed by the above-noted article seemed unlikely to the present inventors. The search for the source of 1-decyne in photo-oxidized cottonseed oil and in cottonseed oil-fried products was thus pursued.

In the course of such study it has been found that cyclopropenoid fatty acids present in cottonseed oil are responsible for the presence of 1-decyne in light struck, fried foods, e.g. potato chips. The present invention thus relates to the frying of oil-absorbing foods in cottonseed oil having an extensively reduced content, if any substantial amount, of cyclopropenoid fatty acid components (CPFA). The invention also relates to fried foods such as farinaceous snack foods, especially snack chips, containing cottonseed oil having a correspondingly small amount, if any, of the cyclopropenoid fatty acid materials. The method and products are especially applicable to potato chips. These products are significantly improved with respect to resistance to photo-oxidation or at least to the formation of oxidation products that produce light struck to a material extent, and the desirable odor and taste of the products are thereby more effectively retained even under conditions that would normally lead to light struck.

Crude cottonseed oils generally contain a substantial amount of CPFA, for example more than about 1.5 weight percent, as determined by the Halphen test. The Halphen test, referred to herein is a known test for CPFA based on the spectrophotometric measurement at $A_{max}505$ nm of a pink complex formed from the reaction of the cyclopropene structure and carbon disulfide-sulfur in pyridine. During normal commercial treatments of the oils to make them more saleable, edible and usable, they generally undergo sequential processing steps that may include refining, bleaching and deodorization. For instance in the preparation of cottonseed oil normally used for frying potato chips, crude cottonseed oils obtained from the cottonseed may be treated in an alkaline solution of sodium hydroxide to separate free fatty acids. The thus-treated oil may be washed with water to remove residual sodium soaps, and bleached with earth to reduce color and sodium content. The oil then may typically be subjected to a second bleaching step. Bleaching may be accomplished at a temperature of 160°–180° F. for a period of about 30 minutes. The bleached oil may be steam deodorized at temperatures about 425° to 485° F. in a vacuum. For example, this treatment may be conducted under a vacuum of up to about 6 or more millimeters of mercury, and for a suitable time, e.g. about 30 minutes. The deodorized oil may then be filtered to provide the refined cottonseed oil ordinarily used in frying potato chips. The resulting oils that are commercially available (herein standard refined cottonseed oils) typically have CPFA contents of the order of at least 0.3 weight percent, often about 0.3 to 1.2 weight percent. It is the use of such oils in frying foods that has led to the light struck problem even though the treated oils are a clear golden color with essentially no odor.

It has been found by the present invention that the organoleptic problems associated with the photo-oxidation of oil-absorbing foods containing cottonseed oils can be avoided to a substantial extent, if not entirely, by using oils in which the CPFA content has been decreased to a sufficiently low level. The cottonseed oil-containing foods such as farinaceous snacks, especially those whose major solids component is derived from potatoes, have greater resistance to becoming light struck and may be otherwise improved with respect to resistance to becoming rancid through thermal oxidation. The snacks may be made from potatoes, grains, e.g. wheat, corn and the like, or mixtures of such materials. Generally, the oil employed in this invention may have a CPFA content of up to about 0.1 weight percent, preferably only up to about 0.05 weight percent. The oil employed in this invention is mainly cottonseed oil although the oil may include a minor amount by weight of one or more other oils such as corn oil, peanut oil, soybean oil or other vegetable oils.

The photo-oxidation of cottonseed oil-containing foods is promoted by sensitizers that naturally occur in the oil in minor amounts. Thus, the small amounts of chlorophyll in the oils increase the tendency of the oils to become light struck, and it also promotes thermal oxidation and the development of rancidity in the fried food products. It is, therefore, advantageous if the oil contains a minimum amount, if any, of sensitizers such as chlorophyll. As the amount of sensitizer increases, the rate of oxidation increases, including the photo-oxidation of CPFA. It is preferred that the oil used in the frying process of the invention contain less than about 0.4 part per million by weight chlorophyll, preferably less than about 0.3 part per million.

There are a number of procedures that are known for decreasing the CPFA content of cottonseed oils. Studies in this respect have been for the most part associated with the possible toxicity of the CPFA or with the use of the oil in poultry feeds where the presence of CPFA has led to the production of off-colored eggs. Regarding toxicity, it is of interest to note that in response to objections to a regulation permitting the use of roasted or cooked glandless cottonseed kernels in baked goods, candy and as a snack food, the U.S. Food and Drug Administration as recently as Sept. 25, 1978, issued a response concluding that the regulation should not be changed and stated extensive reasons for this disposition of the matter, Federal Register, Vol. 43, No. 187, pages 43556-8, Sept. 26, 1978. The FDA thus refused to require that relatively CPFA-free cottonseed materials be used in such foods.

Extensively hydrogenated cottonseed oils are known to have a negative Halphen test and, therefore, do not contain any appreciable amounts of CPFA. However, such oils are plastic, semi-solid or solid in consistency and relatively expensive. Moreover, hydrogenation of the oil seems to lessen its desirability for use as a frying oil on the basis of one or more of flavor, texture and nutritional characteristics of the product, at least with respect to snack foods, especially chips having a substantial, preferably major, proportion of solids from potatoes. Possibly, the decrease in the desirable properties of the cottonseed oils during hydrogenation is due to the resulting change in the distribution of unsaturated and saturated fats. Normally, cottonseed oils have a distribution of fats as glycerides in the ratios of about 20 to 30% saturated acid moieties, about 20 to 30% oleic acid moieties, and about 40 to 55% linoleic acid moieties; usually these ratios are about 24 to 28%, about 24 to 28% and about 40 to 55%, respectively. Typically, the oils have iodine values of about 99 to 115. The present invention is concerned with using such non-hydrogenated cottonseed oils, but yet having a low CPFA content and which are liquid and readily flow at ambient temperature. It is desired not to unduly change the distributions of fatty acid moieties or the iodine value of the oils during the removal of the CPFA or to convert them from being normally liquid to semi-solid, plastic or harder solid materials. We are not aware that such oils have been offered on the commercial market, apparently since no reason has, heretofore, been found sufficient to warrant the expense of producing relatively CPFA-free, non-hydrogenated cottonseed oils.

It has been determined that a good way of reducing the CPFA content of commercially-available, refined, bleached and deodorized, but unhydrogenated, cottonseed oils is to contact them with an acid-activated, finely-divided adsorbent, e.g. acid-treated alumina. Such treatment not only decreases the CPFA content of the oils to an acceptable level but, in addition, the amount of chlorophyll present may be reduced to thereby lower its tendency to promote oxidation reactions in the oils, both photo and thermal-induced oxidation. The CPFA may be removed from the oil by contact with other materials, e.g. aluminum silicate. The latter material may remove chlorophyll also, but the oils seem to retain a somewhat greater susceptibility to thermal oxidation compared with those treated by contact with acid activated alumina. The CPFA can be removed from the oils by other techniques, such as steam treatment under more severe conditions than are normally used in the deodorization step in the commercial processes for the overall refining of crude cottonseed oils.

As noted above, CPFA in refined cottonseed oil may be reduced by contact with acid-activated, finely-divided adsorptive solids, e.g. alumina (see Pons, et al., Bleaching of Refined "Cottonseed Oil with Modified Alumina Adsorbents", *J. Am. Oil Chemists' Soc.* Vol. 40, No. 1 (1963), pp. 10-13). Usually such solids may have a total surface area of at least about 25 $m^2/gm$, preferably at least about 50 $m^2/gm$. The adsorptive solids may be activated by treatment with inorganic or organic acids, preferably inorganic acids such as hydrochloric acid. Treatment of the adsorptive solids with acid may be accomplished by suspending the solids for at least about 15 minutes in an aqueous solution containing sufficient acid to activate the solids, e.g. about 1% to 50% by weight, preferably about 3% to 15% by weight. The solids may be recovered by convenient techniques such as by filtration and may then be dried to a moisture content of, for example, about 10% to 20% by weight.

After acid treatment, the activated solids may contain sufficient acid to catalyze the removal of CPFA from the oil so that the treated oil contains sufficiently less CPFA to have significantly improved resistance to photo-oxidation. Usually, any remaining amount of CPFA is less than about 0.1% by weight, preferably less than about 0.05%. The activated solids may be contacted with the standard commercially-refined cottonseed oil in an amount sufficient to reduce the CPFA content, e.g. about 5% to 15%, preferably about 1% to 10% by weight, of the activated solids may be contacted with the oil. The oil may be heated under reduced pressure for a period of about 15 to 45 minutes or longer, e.g. up to about 2 or 3 hours, at a temperature of about 200° to 250° C. with stirring. The oil may then be cooled to about 50° C. before exposure to the atmosphere, and the adsorbent may be removed by filtration to provide an oil in which the CPFA content is substantially reduced, if not essentially entirely eliminated. In addition by the above method the amount of chlorophyll present in the oil can also be reduced, e.g. to less than about 0.4 ppm, preferably less than about 0.3 ppm.

It has also been found that the CPFA content of standard, commercially refined cottonseed oils may be reduced to the foregoing stated levels by contacting the oils with a fixed bed catalyst, such as, for instance, finely-divided alumina-silica (see Deutschman et al., Catalytic Elimination of Cyclopropene-Containing Acids, *J. Am. Oil Chemists Soc.*, Vol. 41, (1969), pp. 175-176). Batch or continuous procedures may be employed. The amount of catalyst should be sufficient to reduce the CPFA content to an acceptable level, e.g. about 1% to 20% by weight of the catalyst based on the weight of cottonseed oil being treated. While these techniques are generally quite effective in reducing the CPFA content of such oils, it has been found that where fixed bed catalysts of the aluminum silicate type are employed, rather than for instance, acid-treated alumina, the oils appear to retain a greater susceptibility to thermal oxidation as compared to oils treated with the acid-treated activated alumina.

It is also known the the CPFA content of standard, refined, commercially-available cottonseed oil may be reduced to the extent stated above for the oils used in this invention by relatively severe steam treating of the oil (see Eaves, et al., "Elimination of the Halphen Response of Cottonseed Oils in Conjunction with Deodorization", *J. Am. Oil Chemists' Soc.*, Vol. 45, (1968), pp. 293-295). Typically such severe steam treatment may be accomplished by heating the oil to a temperature of about 420° F. to 480° F.; preferably about 440° F. to 470° F. in the presence of a steam sparge under substantial vacuum conditions, e.g. about 6 mm or less. The period of treatment may be for about 30 minutes to about five hours or more depending upon the amount of CPFA to be removed. With regard to the steam treatment of the oils to reduce CPFA, it has now been found that in a commercial plant for the production of standard, refined cottonseed oil, CPFA may be adequately reduced to an acceptably low level by, for instance doubling the normal deodorization time, e.g. raising the 30 minutes used to produce the standard oil to about 1 hour.

The specially-treated, unhydrogenated cottonseed oil, having reduced CPFA content prepared by any of the above techniques may be used to fry snacks and other food products having improved light stability. Generally, the major solids component of such snack foods may be derived from potatoes, although other snack foods containing for instance corn, wheat or other grains may conveniently be prepared by the method of the present invention. If the snack food is potato chips, the chips may be prepared by cutting essentially uncooked, natural potatoes into slices of a thickness suitable for making potato chips by means of any of the various devices that are available for such use. Typically, whole, raw potatoes may be scrubbed prior to slicing and they may be either peeled or left unpeeled. Generally, individual potato slices or dough-derived chips have a thickness of up to about 0.1 inch, e.g., about 0.01 to 0.1 inch, usually about 0.03 to 0.07 inch, and these slices are suitable for producing potato chips according to the process of the invention. The potato slices may be washed in water to improve their handling characteristics during further processing according to the invention. Specifically, washing of the potatoes removes surface starch and diminishes the tendency of the slices to stick together or to stick to machinery. It may be desired to blanch the potatoes prior to slicing. Blanching at this and/or another time, e.g., after slicing, can be accomplished by chemical or steam treatment.

The products of this invention may be fried in any suitable means for frying snack foods, such as deep fat frying. Typically the food may be more or less immersed in the cottonseed oil having reduced CPFA content, for a period of from about 60 to 160 seconds, preferably about 90 to 130 seconds, at a temperature of from about 105° C. to 200° C., preferably about 160° to 190° C. to fry the food. The products are then removed from the fryer, cooled, and, if desired, salt or other flavoring agents may be added. The cottonseed oils of reduced CPFA content may alternatively or, in addition, be provided in the fried foods by incorporation in the food after frying in the cottonseed oil of reduced CPFA content or in another oil.

The present invention will be further exemplified by the following examples that are not to be considered limiting.

EXAMPLE 1

An acid-treated, activated alumina catalyst was prepared by grinding activated alumina having a mesh size of from about 80 to 200 mesh and sieving through a 200 mesh screen. Fifty grams of the thus-prepared alumina was suspended in 500 milliliters of an 8 percent HCl solution by stirring constantly for 1 hour. The resultant mixture was filtered to recover catalyst and the catalyst was air-dried.

Fifty grams of refined cottonseed oil (CSO) (0.3 percent CPFA by weight and 0.7 ppm chlorphyll) and 4 grams of the acid-treated, activated alumina catalyst were added to a three-neck 500 cc. round-bottom flask equipped with stirrer, thermometer, $H_2O$ condenser and gas inlet tube. The flask was sparged with nitrogen, heated with a heating mantle and maintained at a temperature of 225° C. for 30 minutes, cooled to 50° C. and centrifuged at 15,000 rpm for 30 seconds, and the supernatant oil was collected.

The CPFA content of the product was negative (i.e. 0 percent) as measured by the Halphen test. By visible spectra (700-500 nm) analysis of the product (AOAC method) it was determined that the chlorophyll concentration was 0.1 ppm.

EXAMPLE 2

Fifty milliliters of refined cottonseed oil from the same batch used in Example 1, and 5 grams of an aluminum silicate catalyst (Alfa Products, $Al_2Si_2O_7 \cdot 2H_2O$) were added to a three-necked flask equipped as in Example 1. The flask was sparged with nitrogen, heated with a heating mantle to about 180° ± 3° C. with stirring for 2 hours, cooled and then centrifuged at 15,000 rpm for 30 minutes at room temperature. The supernatant oil was clear although the color remained unchanged. The product CPFA content was negative as measured by the Halphen test, and by visible spectra (700-500 nm) analysis of the product it was determined that the chlorophyll concentration was 0.39 ppm.

EXAMPLE 3

Two grams each of three samples of cottonseed oil, i.e., standard refined cottonseed oil, cottonseed oil treated with acid-treated, activated alumina as in Example 1, and cottonseed oil treated with the aluminum silicate catalyst as in Example 2 were sealed in a half-pint, clear, glass jar and exposed to fluorescent light at 500 ft.-candles and at a temperature of 82° F. The results after four days of exposure and after six days of exposure are set forth below in Table 1.

TABLE 1

| Cottonseed Oil Sample | Initial | | 4 Days | | 6 Days |
|---|---|---|---|---|---|
| | $PV^a$ | 1-decyne$^b$ | PV | 1-decyne | PV |
| Standard refined | 9.6 | 0$^c$ | 174.4 | 372 | 265.7 |
| Acid-modified, activated alumina-treated | 1.8 | 0 | 41.3 | 0 | 63.1 |
| Aluminum Silicate treated | 3.7 | 0 | 56.8 | 0 | 79.0 |

$^a$PV = value determined according to AOAC method CD8-53, and the peroxide value is reported as milliequivalents per kilogram of oil.
$^b$The 1-decyne concentrations are measured by GLC headspace volatiles analysis at room temperature and are shown by the integrator peak area divided by 1000.
$^c$Not detectable.

The 1-decyne contents, as well as the PV data (PV has been employed as a well-known index for oil oxidation. Also, we have proven that peroxides are an intermediate during the formation of 1-decyne from CPFA) set forth in Table 1 show that the HCl-modified, activated alumina catalyst and an aluminum silicate catalyst of the types disclosed in Examples 1 and 2, respectively, are very effective in the catalytic destruction of precursors of 1-decyne in liquid cottonseed oil and resulted in the reduction of 1-decyne and peroxides formation in oil upon exposure to light.

EXAMPLES 4–7

In Examples 4 to 7, *Sterculia foetida* seed oil (SFSO) was used to determine the relationship among 1-decyne (as light-struck product), cyclopropene fatty acid (as precursor) and chlorophyll (as photosensitizer). SFSO consists of approximately 55% cyclopropene fatty acids as reported in Lipid, 13, 232–238 (1978). In Example 4, there were two runs, one using acid-modified, activated alumina, CPFA-destructed, cottonseed oil, and a second using the destructed cottonseed oil plus SFSO. In Example 5, there were also two runs, one using aluminum silicate catalytic, CPFA destructed, cottonseed oil, and a second using the destructed oil plus SFSO. In Example 6, the first run used standard refined cottonseed oil (containing limited CPFA) and the second run used the standard refined oil plus SFSO. In Example 7, Run 1 involved oleic acid as a carrier plus SFSO, and in Run 2 chlorophyll, as well as SFSO, were added to the oleic acid carrier.

The oil samples containing various contents of CPFA and chlorophyll were then subjected to photo-oxidation conditions (500 ft.-candles of fluorescent light with the set up similar to that of Example 3) for a period of five days. The results, summarized in Table 2 below, illustrate that the precursors of 1-decyne in liquid cottonseed oil are cyclopropene fatty acids, and that the formation of 1-decyne by photo-oxidation of cyclopropene fatty acids furthermore is enhanced by the presence of chlorophyll in the oil. Chlorophyll also enhances 1-decyne formation from CPFA in an oleic acid carrier.

TABLE 2

| Example | Run | Sample | Chlorophyll[a] | CPFA[b] | 1-Decyne |
|---|---|---|---|---|---|
| 4 | 1 | Aluminum silicate | 0.4 ppm | 0 | 0 |
|   | 2 | Aluminum silicate plus SFSO | 0.4 ppm | 0.42% | 728 |
| 5 | 1 | HCL-modified, activated alumina CSO | 0.1 ppm | 0 | 0 |
|   | 2 | HCL-modified, activated alumina CSO plus SFSO | 0.1 ppm | 0.52% | 949 |
| 6 | 1 | Cottonseed oil | 0.7 ppm | 0.3% | 412 |
|   | 2 | Cottonseed oil plus SFSO | 0.7 ppm | 0.68% | 2365 |
| 7 | 1 | Oleic acid plus SFSO | 0 ppm | 0.52% | 170 |
|   | 2 | Oleic acid plus SFSO plus chlorophyll | 10 ppm | 0.45% | 3073 |

[a]Chlorophyll concentration is determined according to AOAC spectrophotometric method 3.107 (12th Edition).
[b]Cyclopropenoid fatty acid content is based on Halphen reaction (Anal. Chem. 32, 1809 (1960)).

EXAMPLES 8 AND 9

To further identify the precursor of 1-decyne, a pure synthetic methyl sterculate (one of the cyclopropene fatty acid components in cottonseed oil) was purchased from Supelco, Inc. and was incorporated into the aluminum silicate destructed, cottonseed oil for photo-oxidation examination. The 1-decyne measurements, after four days light exposure of 500-ft.-candle fluorescent light at 82° F. (experimental set-up similar to Example 3), are presented in Table 3.

TABLE 3

| Example | Cottonseed Oil | Chlorophyll | Cyclopropene Fatty Acid Component | 1-Decyne |
|---|---|---|---|---|
| 8 | Aluminum silicate destructed[a] | 0.4 ppm | 0[a]% | 0[a] |
| 9 | Aluminum silicate destructed plus methyl sterculate | 0.4 ppm | 0.25% | 502 |

[a]Not detectable.

Examples 8 and 9 show that the precursor of 1-decyne is sterculic acid (a cyclopropene fatty acid).

EXAMPLES 10–13

Four cottonseed oil samples were prepared, i.e. standard refined cottonseed oil (Example 10), cottonseed oil treated in a silica gel 60 column (Example 11, prepared by passing the warm CSO through a silica gel 60 column), cottonseed oil treated with aluminum silicate catalyst (Example 12), and HCl-modified alumina (Example 13). Analyses of the chlorophyll and CPFA contents of the four samples are set forth below in Table 4.

TABLE 4

| Example | Cottonseed Oil Sample | Chlorophyll in ppm | CPFA Weight % |
|---|---|---|---|
| 10 | Standard refined | 0.76 | 0.34 |
| 11 | Silica gel column treatment | 0[a] | 0.36 |
| 12 | Aluminum silicate | 0.39 | 0[a] |
| 13 | HCl-modified alumina treatment | 0.15 | 0[a] |

[a]Not detectable

Table 4 illustrates that the combination of silica gel 60 (EM Laboratories, Inc.) column plus catalytic treatment methods (aluminum silicate or acid-modified alumina) would eliminate chlorophyll and CPFA present in the oil. Using HCl-modified, alumina treatment alone substantially reduced the chlorophyll content and eliminated CPFA.

EXAMPLES 14–16

In Examples 14 and 15, two 50 gram samples of fresh commercial potato chips, which were previously prepared by frying in standard refined cottonseed oil containing 0.34 percent CPFA, were exhaustively extracted with chloroform to remove oil from the chips. The chloroform was removed from the extracted oil at 40° C. under reduced pressure in a rotary evaporator to yield 20.73 grams (Example 14) and 17.20 grams (Example 15) of cottonseed oil in the respective samples. In Example 16, a separate 50 gram sample of the commercial potato chips was stored in a "Banlite" opaque bag for 14 days while being continuously exposed to 200 ft.-candles of light. Oil was then separated from the chips by the same chloroform extraction process. The test results were as follows:

| Example | CPFA in Extracted Oil (Wt. Percent) |
|---------|-------------------------------------|
| 14 | 0.28 |
| 15 | 0.32 |
| 16 | 0.34 |

The data indicated that the naturally-contaminating CPFA existing in standard refined cottonseed oil was not destroyed by the high temperature frying process.

EXAMPLE 17

An acid-treated alumina catalyst is prepared using alumina (80–200 mesh) obtained from Fisher Scientific Company. The alumina was ground and sieved through a 200 mesh size screen and then activated by treatment with hydrochloric acid using the technique described in Example 1.

One hundred grams of standard refined cottonseed oil (about 0.34 percent by weight CPFA) was placed in a 3-necked flask and heated to a temperature of 225° C. for 30 minutes in the presence of 5 grams of the acid-modified alumina catalyst. The reaction was maintained under water aspirator vacuum pressure, and after 30 minutes, the oil was filtered to remove the alumina adsorbent. The filtrate (oil phase) was collected, and CPFA content was measured as zero. The data indicated that the catalytic elimination of CPFA can be performed under either nitrogen or vacuum.

EXAMPLE 18

A two-pound batch of potato chips was fried at 340°–365° F. for two minutes in CPFA-free cottonseed oil prepared as in Example 1 (CPFA 0 percent and 0.1 ppm chlorophyll), and another two-pound batch was fried in the same manner in standard refined cottonseed oil (CPFA 0.3 percent, and 0.67 ppm chlorophyll). There was no distinct difference in the initial aroma or flavor between the two kinds of oil-fried chips.

The photostability characteristics of the potato chips prepared in cottonseed oil treated as in Example 1 were then compared to the similar product prepared in standard refined cottonseed oil. For quick differentiation, 25 gram samples from the respective batches were packed in clear plastic bags and exposed to 500 ft.-candles of fluorescent light at 84° F. The accelerated test results are summarized in Table 6.

TABLE 6

| Cottonseed Oil | CPFA | Aroma/Flavor[a] | | | 1-Decyne[b] | |
|---|---|---|---|---|---|---|
| | | Initial | 1 Day | 4 Days | Initial | 4 Days |
| Regular | 0.3% | o.k. | L.S. | L.S. | 0 | 176 |
| Destructed | Trace | o.k. | o.k. | o.k. | 0 | 0 |

[a]Aroma/flavor is only evaluated by an informal taste panel to detect light-struck (L.S.)
[b]GLC headspace volatile analysis is shown by peak area of integrator divided by 10³.

As the results in Table 6 illustrate, there is a much higher production of 1-decyne from the regular cottonseed oil-fried potato chips than from the CPFA-destructed, cottonseed oil-fried chips.

EXAMPLE 19

Two and a half pound batches of potato chips were prepared. One was fried in "improved" cottonseed oil (I-CSO) treated as in Example 17 (CPFA less than 0.01% and chlorophyll less than 0.2 ppm), and the other was fried in standard refined cottonseed oil (CPFA 0.76% and chlorophyll 0.8 ppm) to provide "control chips". These chip samples are packaged in clear, glassine, (95% light transmission) and "Banlite" (only 5% light transmission) bags and stored under 500 ft.-candles and 200 ft.-candles of fluorescent light, respectively, at room temperature. As a function of time, 1-decyne production is determined. The following two tables summarize the potato chips comparative results in terms of the relative amounts of 1-decyne present in the chips after exposure to the 500 ft.-candle light and 200 ft.-candle light, respectively.

TABLE 7

(1-decyne under 500-ft. candles)

| Days of Light Exposure | Glassine Bags | | Clear Bags | |
|---|---|---|---|---|
| | CSO | I-CSO[a] | CSO | I-CSO |
| 0 | 0 | 0 | 0 | 0 |
| 2 | 8 | 0 | 117 | 0 |
| 3 | 93 | 0 | 168 | 3 |
| 4 | — | — | 460 | 85 |
| 6 | — | 0 | 1000 | — |
| 8 | 403 | 0 | — | — |

TABLE 8

(1-decyne under 200 ft.-candles)

| Days of Light Exposure | Clear Bag | | Glassine Bag | | Opaque Bag | |
|---|---|---|---|---|---|---|
| | CSO | I-CSO | CSO | I-CSO | CSO | I-CSO |
| 0 | 0 | 0 | 0 | 0 | 0 | 0 |
| 3 | 152 | 18 | 373 | 0 | — | — |
| 6 | 763 | 44 | 216 | 7 | 191 | — |
| 8 | — | — | — | — | — | — |
| 9 | 460 | 85 | — | — | — | — |
| 13 | | | 2108 | 0 | — | 0 |
| 14 | | | — | — | 818 | 0 |
| 23 | | | 3602 | 0 | | |

The above two tables illustrate that there is a great difference in the production of 1-decyne (which is responsible for photo-induced off-flavor) between potato chips fried in standard refined cottonseed oil (CSO) and catalytic "improved" cottonseed oil (I-CSO).

EXAMPLE 20

A ten-gallon batch of standard refined cottonseed oil which was deodorized in the usual manner was obtained from a commercial vegetable oil company. A separate ten-gallon batch which was deodorized for about twice as long a normal deodorization, was also obtained. Both batches were analyzed for CPFA and chlorophyll content based on the Halphen test and the AOAC method. The content of levels of CPFA and chlorophyll were determined as set forth below in Table 9.

TABLE 9

| Cottonseed Oil | Chlorophyll | CPFA | CPFA Reduction |
|---|---|---|---|
| Once-deodorized | 0.61 ppm | 0.55% | — |
| Twice-deodorized | 0.12 ppm | 0.05% | 91% |

As illustrated in Table 9, longer deodorization reduces the CPFA content as well as the chlorophyll pigment concentration.

Potato chips were prepared in the aforementioned two kinds of cottonseed oil, i.e., once-deodorized (normal process) and twice-deodorized oil, respectively. These potato chips were packaged in glassine and Banlite bags for stability evaluation under simulated store conditions (200 ft.-candles of fluorescent light at room temperature). GC headspace volatiles analysis, and storage taste panels were performed periodically. The following two tables present the stability comparison results between those two kinds of potato chips.

TABLE 10

Comparative Stability of Potato Chips by 1-Decyne Formation

| Cottonseed oil | Package | 0 | 7 | 14 | 19 | 27 | 43 | 49 |
|---|---|---|---|---|---|---|---|---|
| Once-deodorized | Glassine | 0 | 0 | 260 | 280 | 729 | 786 | |
| Twice-deodorized | Glassine | 0 | 0 | 40 | 47 | 49 | 54 | |
| Once-deodorized | Banlite | 0 | — | 96 | 107 | 102 | 163 | 249 |
| Twice-deodorized | Banlite | 0 | — | 0 | 14 | 7 | 45 | 30 |

TABLE 11

Potato Chips Storage Taste Panel Results[a]

| Cottonseed Oil | Package | 0 | 7 | 14 | 21 | 28 | 35 | 42 | 49 |
|---|---|---|---|---|---|---|---|---|---|
| Once-deodorized | Glassine | Acc[b] | Acc | Un.[c] | Un. | Un. | Un. | | |
| Twice-deodorized | Glasine | Acc | Acc | Acc | Acc | Acc | Un. | | |
| Once-deodorized | Banlite | Acc | — | Mar.[d] | Acc | Mar. | Mar. | Un. | |
| Twice-deodorized | Banlite | Acc | — | Acc | Acc | Acc | Acc | Acc | Mar. |

[a]Hedonic storage taste panel includes six panelists.
[b]Acceptable if the average score is greater than 5 based on scale of 1 to 9, with 9 as the most accepted score.
[c]Unacceptable if the average score is less than 5.
[d]Marginal if the average score is about 5.

Therefore, the data in Tables 9 to 11 clearly demonstrated that the potato chips fried in the improved cottonseed oil (twice-deodorized oil contaning both CPFA and chlorophyll in trace amounts) do possess more resistance toward oil oxidatio and a longer shelf-life than those chips fried in normally processed cottonseed oil (once-deodorized oil contaning significant amount of CPFA and chlorophyll) regardless of the transparency characteristics of package.

What is claimed is:

1. A method for counteracting the development of light-induced, undesirable organoleptic characteristics in an oil-absorbent, farinaceous food fried in cottonseed oil which comprises frying said food in non-hydrogenated cottonseed oil in which the cyclopropenoid fatty acid content is about 0.1% or less and sufficiently low to resist the development of said characteristics.

2. The method of claim 1 wherein said oil-absorbing food is food whose major solids content is potato solids.

3. The method of claim 2 wherein said food is potato chips.

4. The method of claim 1, 2 or 3 wherein the cyclopropenoid fatty acid content of said cottonseed oil used for frying said food is up to about 0.05% by weight.

5. The method of claim 4 wherein the chlorophyll content of said cottonseed oil used for frying said food is less than about 0.3 part per million.

6. The method of claim 1, 2 or 3 wherein chlorophyll has been removed from said cottonseed oil.

7. The method of claim 6 wherein the chlorophyll content of said cottonseed oil used for frying said food is less than about 0.4 part per million.

8. The product produced by the process of claim 1.

* * * * *

UNITED STATES PATENT OFFICE
CERTIFICATE OF CORRECTION

Patent No. 4,283,437    Dated  August 11, 1981

Inventor(s) Lucy L. Fan et al.

It is certified that error appears in the above-identified patent and that said Letters Patent are hereby corrected as shown below:

Column 1, line 18, "an" should be --and--.

Column 4, line 59, "(1969)", should be --(1964)--.

Column 5, line 4, "the" (first occurrence) should be --that--.

Column 6, line 64, (footnote a), the word "Peroxide" was omitted.

Column 11, Table 11, about line 10, the row should read:

Once-
deodorized Banlite   Acc  -  Acc Mar.[d]  Acc Mar.  Mar.  Un.

Signed and Sealed this

*Twenty-fourth* Day of *November 1981*

[SEAL]

Attest:

GERALD J. MOSSINGHOFF

*Attesting Officer*    *Commissioner of Patents and Trademarks*

UNITED STATES PATENT AND TRADEMARK OFFICE
Certificate

Patent No. 4,283,437  
Patented August 11, 1981

Lucy L. Fan, Alan Wohlman & Bobby J. Longan

Application having been made by Lucy L. Fan, Alan Wohlman and Bobby J. Longan, the inventors named in the patent above identified, and Frito-Lay, Dallas, Tex., a coporation of Del., the assignee for the issuance of a certificate under the provisions of Title 35, Section 256, of the United States Code, adding the name of Jiunn-Yann Tang as a joint inventor, and a showing and proof of facts satisfying the requirements of the said section having been submitted, it is this 5th day of Apr. 1983, certified that the name of the said Jiunn-Yann Tang is hereby added to the said patent as a joint inventor with the said Lucy L. Fan, Alan Wohlman and Bobby J. Longan.

Fred W. Sherling,  
*Associate Solicitor*